Figure 1:
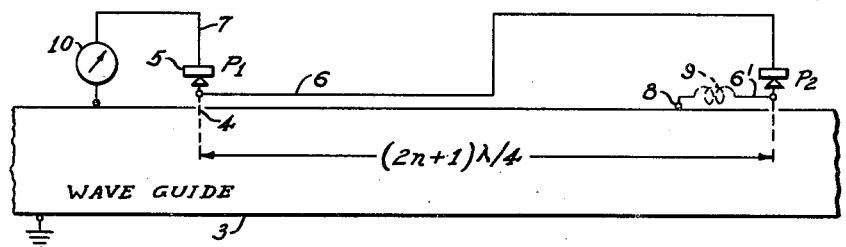

July 8, 1952  T. MILLER  2,602,827

WAVE GUIDE INCIDENT WAVE MEASUREMENT

Filed April 1, 1948

WITNESSES:

INVENTOR
Theadore Miller.
BY
O. B. Buchanan
ATTORNEY

Patented July 8, 1952

2,602,827

UNITED STATES PATENT OFFICE 2,602,827

WAVE GUIDE INCIDENT WAVE MEASUREMENT

Theadore Miller, Pittsburgh, Pa., assignor, by mesne assignments, to the United States of America as represented by the Secretary of the Navy Application April 1, 1948, Serial No. 18,343

4 Claims. (Cl. 171—95)

My invention relates to an improved means for measuring or responding to the incident wave in a wave guide or other high-frequency transmission line of a type adapted at times to have incident and reflected standing waves therein. While my invention was particularly designed for, and is particularly applicable to, wave guides, and while it will be described and explained with particular reference to a wave guide, the general principles of my invention are applicable to other types of transmission lines, and it is desired that the subsequent illustrations and explanations be understood with this explanation in mind.

At least two general types of apparatus have been known, heretofore, for continuously indicating the incident power-level in a wave guide. One previously known method involves the use of a directional coupler, with a measuring device inserted in, or coupled to, the directional coupler, thereby producing a fairly accurate, but cumbersome and space-consuming measuring-device. The other known type of wave-guide measuring-device has involved the use of a sliding probe, or other coupler, which has had the disadvantage of requiring a large number of readings, at different points along the guide, and a time-consuming calculation from said readings, before the desired power-level could be ascertained, and which required most meticulous accuracy of machining, requiring accuracies down to a thousandth of an inch or less, if even a reasonably close approximation was desired.

The object of my present invention is to provide a new means for instantaneously or continuously determining the magnitude of an incident wave of known wavelength in a wave guide, this determination being independent of the phase of the standing wave, and for small values of standing-wave ratio being nearly independent of the magnitude of the standing wave.

More specifically, an object of my invention is to provide two substantially identical detector-means, substantially identically coupled to the wave guide at two points spaced substantially $(2n+1)\lambda/4$ from each other along the guide, where $n$ is any integer and $\lambda$ is the wavelength in the guide, with means for responding to the sum of he unidirectional outputs of the two detector-means, the coupling-points of the detector-means being spaced anywhere along the guide, the only requirement being that they shall be spaced an odd number of quarter-wavelengths apart.

Figure 2:
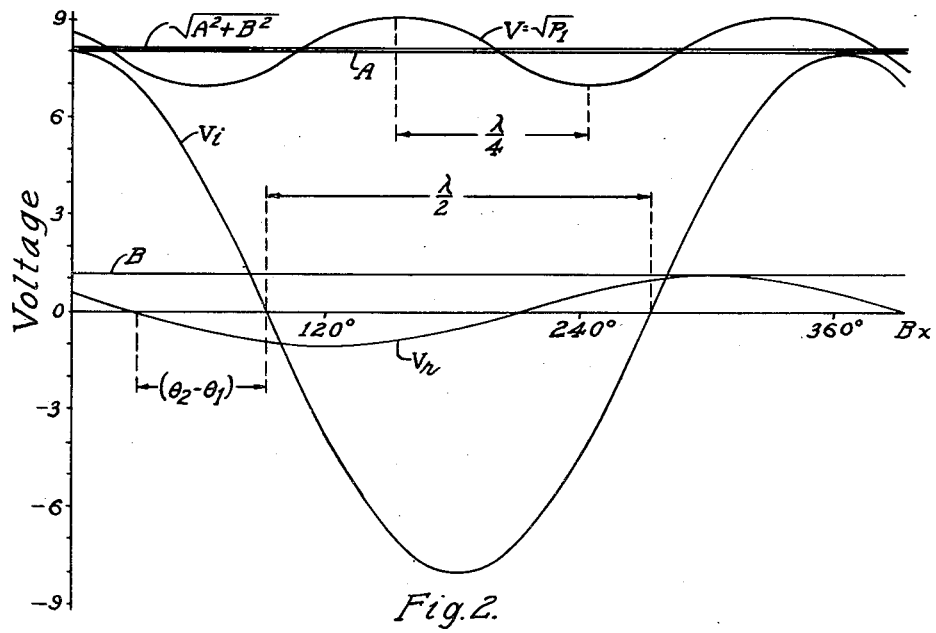

With the foregoing and other objects in view, my invention consists in the circuits, systems, combinations, apparatus, parts, and methods hereinafter described and claimed, and illustrated in the accompanying drawing, wherein:

Figure 1 is a diagrammatic view of a wave-guide measuring-device in accordance with my invention, and Fig. 2 is a curve-diagram which will be referred to in the explanation.

In Fig. 1, I have shown my invention applied to a wave guide 3, which may transmit energy in any mode of excitation. This energy will usually have a known constant wavelength $\lambda$ in the guide, although my invention is not altogether limited to such a condition. Two coupling-means are provided, which are illustrated in the form of crystal-detector probes $P_1$ and $P_2$, which are spaced an odd number of quarter-wavelengths apart, that is, $\lambda/4$, $3\lambda/4$, $5\lambda/4$, or the like. The nature of these coupling-devices will depend upon the nature of wave-propagation in the guide. In the $TE_{01}$ mode of propagation, which is the commonest mode, the coupling-devices will simply be probes 4 projecting into the wave guide by a small amount which determines the degree of coupling. The external ends of the probes 4 are connected to crystal-detectors 5 which produce a unidirectional output-voltage in the output-terminals 6 and 7 of the crystal. One of the probes, such as $P_1$, is insulated from the wave guide, while the other probe $P_2$ has one of its terminals, 6', grounded thereto, as indicated at 8, this ground-connection constituting in effect a short-circuit for direct-current, but an open-circuit for the radio-waves, as diagrammatically indicated by the insertion of an equivalent-circuit radio-frequency choke 9 in the ground-connection 8.

In accordance with my invention, the two unidirectional-voltage outputs of the two probes $P_1$ and $P_2$ are connected together in series, and the combined resultant output is measured by any measuring-device 10, such as a micro-ammeter.

If the frequency, and hence the wavelength $\lambda$, of the radio wave is fixed, then the two probes $P_1$ and $P_2$ can be at a fixed distance apart. If the wavelength $\lambda$ is not a constant, then the position of one of the probes will have to be adjusted longitudinally along the guide to accommodate the wavelength of the wave which is to be measured to determine its power-level. In either event, the two probe-detectors $P_1$ and $P_2$ must be separately adjusted so that their output is the same, for a given power-level, which can be done by adjusting the terminals of the wave guide so that there is no reflected wave, and by adjusting the degrees of couplings of the two probes by adjusting the length of penetration of the respective probes into the wave guide.

At any cross-sectional plane or probe-location within a lossless wave guide, there are two voltage-components; namely an incident voltage $$V_i = A\epsilon^{j(\theta_1-\beta x)} \quad (1)$$

and a reflected voltage $$V_r = B\epsilon^{j(\theta_2+\beta x)} \quad (2)$$

where $\beta = 2\pi/\lambda =$ the phase constant of the guide (3)
$\lambda =$ the wavelength in the guide, and
$x =$ the distance along the guide, measured from the input end.

The total or actual voltage at this cross-sectional plane or probe-location is $$V = V_i + V_r = A\epsilon^{j(\theta_1-\beta x)} + B\epsilon^{j(\theta_2+\beta x)} \quad (4)$$

The magnitude of this voltage is $$|V| = \sqrt{A^2 + B^2 + 2AB\cos(\theta_1-\theta_2-2\beta x)} \quad (5)$$

If the first probe $P_1$ is located at a distance $x$ from the input-end of the wave guide, and if it is responsive to the power, or to the square of the magnitude of the voltage, as in the case of a crystal operating in the square-law region of the crystal-characteristic; the unidirectional-voltage response of the probe-detector may be written $$P_1 = k[A^2 + B^2 + 2AB\cos(\theta_1-\theta_2-2\beta x)] \quad (6)$$

If the second probe $P_2$ is spaced from the first probe $P_1$ by an odd number, $(2n+1)$, of quarter-wavelengths, $\lambda/4$, along the guide, $n$ being any integer, (theoretically including zero), then the angle $\beta x$ will have to be replaced by $$[\beta x + (2n+1)\pi/2]$$

and if the second probe $P_2$ has the same response-coefficient $k$, its unidirectional-voltage response will be $$P_2 = k\{A^2 + B^2 + 2AB\cos[\theta_1-\theta_2-2\beta x+(2n+1)\pi]\}$$
$$= k[A^2 + B^2 - 2AB\cos(\theta_1-\theta_2-2\beta x)] \quad (7)$$

It will readily be seen that the sum of the probe-responses is $$P_1 + P_2 = 2k(A^2 + B^2) \quad (8)$$

This means that the total probe-response $(P_1+P_2)$ is independent of the phase $$(\theta_2-\theta_1+2\beta x)$$

of the reflected wave $V_r$ relative to the incident wave $V_i$, and is also independent of the position $x$ of the probe-detectors along the wave guide. Now $A$ and $B$ represent the magnitudes of the incident and reflected voltage-components, respectively, and $A^2$ and $B^2$ are therefore proportional to the incident and reflected powers, respectively.

Assuming that we wish to obtain a response to $A^2$, or to the incident power, substantially independent of the probe-location or of the relative phases of the incident and reflected waves within the wave guide, my double-probe response $(P_1+P_2)$ is always responsive to $(A^2+B^2)$, that is, to the sum of the magnitudes of the incident and reflected powers, as shown in Equation 8, whereas the response of a single randomly positioned probe $P_1$ will vary between a maximum value $$P_{max} = k(A^2 + B^2 + 2AB) = k(A+B)^2 \quad (9)$$

and a minimum value $$P_{min} = k(A^2 + B^2 - 2AB) = k(A-B)^2 \quad (10)$$

according to the value of the phase-angle $$(\theta_1-\theta_2-2\beta x)$$

which happens to occur at the probe-location $x$, as shown in Equation 6.

In a large majority of wave-guide designs, two conditions are persent, and my invention is particularly applicable (although not necessarily limited) to designs in which these two conditions are present, at least within the distance $$(2n+1)\lambda/4$$

between the two probes $P_1$ and $P_2$. First, the wave guide is substantially lossless, as was initially assumed in stating Equation 1; and second, the power standing-wave ratio PSWR, or the standing-wave ratio for the power, is small, usually less than 2, and generally less than 3.

The power standing-wave ratio PSWR is the square of the voltage standing-wave ratio $$\rho = \frac{A+B}{A-B} \quad (11)$$

which is defined as the ratio of the maximum voltage $(A+B)$ to the minimum voltage $(A-B)$ which appears along the wave guide. We have therefore, $$PSWR = \rho^2 = \left(\frac{A+B}{A-B}\right)^2 \quad (12)$$

$$\frac{B^2}{A^2} = \frac{(\sqrt{PSWR}-1)^2}{(\sqrt{PSWR}+1)^2} \quad (13)$$

We can therefore calculate my double-probe approximation $(A^2+B^2)$ of the input-power $A^2$, as compared to the maximum and minimum power-responses $(A+B)^2$ and $(A-B)^2$ which are obtainable with a movable single probe, as shown in the following table:

| I | II | III | IV | V | VI | VII | VIII | IX |
|---|---|---|---|---|---|---|---|---|
| PSWR | $\sqrt{PSWR}$ | $(\sqrt{PSWR}-1)^2$ | $(\sqrt{PSWR}+1)^2$ | $B^2/A^2$ =III/IV | $(A^2+B^2)/A^2=$ $(P_1+P_2)/2kA$ $=1+V$ | $B/A=\sqrt{V}$ | $(1+VII)^2=$ $(A^2+B^2+2AB)/A^2$ $=P_{max}/kA^2$ | $(1-VII)^2=$ $(A^2+B^2-2AB)/A^2$ $=P_{min}/kA^2$ |
| 1 | 1 | 0 | 4 | 0 | 1.000 | 0 | 1.00 | 1.00 |
| 1.2 | 1.0954 | .0091 | 4.39 | .0021 | 1.002 | .0441 | 1.09 | .91 |
| 1.5 | 1.2247 | .0505 | 4.95 | .0102 | 1.010 | .1010 | 1.21 | .81 |
| 1.75 | 1.3229 | .1043 | 5.40 | .0193 | 1.019 | .1389 | 1.30 | .74 |
| 2 | 1.4142 | .1716 | 5.83 | .0294 | 1.029 | .1715 | 1.37 | .69 |
| 3 | 1.73205 | .5359 | 7.46 | .0718 | 1.072 | .268 | 1.61 | .54 |

From column VI of this table, it will be seen that my double-probe arrangement will measure or respond to the incident-power level $A^2$ with an error less than 2% (which is higher than the accuracy of commonly available instruments), when the power standing-wave ratio PSWR is as high as 1.75 (which is higher than in most wave-guide applications). At the same PSWR=1.75, columns VIII and IX show maximum and minimum single-probe power-responses of 130% and 74% of the true value of the incident power-level $A^2$.

The operation of my device is also indicated by the curve-diagrams shown in Fig. 2, wherein the instantaneous value of voltage of the incident wave is indicated at $V_i$, at one particular instant, plotting the magnitude of this voltage at different points $\beta x$ along the wave guide, the voltage being indicated by arbitrary figures, and the guide-length being indicated in terms of degrees and wavelengths $\lambda$. The magnitudes of the instantaneous voltages of the reflected wave, at different points along the guide, is indicated in Fig. 2 by the curve $V_r$, assuming a case in which the maximum voltage-level B of the reflected wave is in the ratio of 1.1 to 8, with respect to the maximum voltage-level A of the incident wave. The reflected wave $V_r$ is assumed to be leading the incident wave $V_i$ by the angle $(\theta_2-\theta_1)$. The magnitude of the probe-response, expressed in terms of the average, or R. M. S., or peak-values of the incident and reflected waves, as expressed in Equation 5, is shown in Fig. 2 by the curve V, which also represents the square root of the response of either one of the two probes, such as $P_1$, for example. The value of the response which is obtained from my two probes $P_1$ and $P_2$, operating together, is indicated, in Fig. 2, by the straight line $\sqrt{A^2+B^2}$, in accordance with Equation 8.

While I have described my invention with reference to but a single illustrative form of embodiment, and while I have more particularly illustrated and referred to a wave-guide type of transmission line, I wish it to be understood that my invention is not altogether limited to this precise form, as has been intimated at various places hereinabove. I desire, therefore, that the appended claims shall be accorded the broadest construction consistent with their language.

I claim as my invention:

1. The combination with a wave guide adapted to carry standing waves of a predetermined fixed wavelength $\lambda$, of two substantially identical detector-means substantially identically coupled to the wave guide at two points spaced substantially $(2n+1)\lambda/4$ from each other along the guide, where $n$ is any integer, said detector-means each producing a unidirectional voltage dependent upon the magnitude of a given quantity in the guide at its point of coupling, combining-circuit means associated with only said two detector-means for producing an electrical quantity which is the sum of only the two electrical quantities which appear in the output-terminals of the two detector-means, and response-means included in said circuit-means for responding to the sum of the unidirectional outputs of the two detector-means.

2. In combination, a high-frequency transmission line of a type adapted at times to have incident and reflected standing waves therein, said standing waves having a predetermined fixed wavelength $\lambda$, said transmission line having an input point and output point, two substantially identical detector-means substantially identically coupled to the transmission line at two intermediate coupling points between said input point and said output point, said two coupling points being spaced substantially $(2n+1)\lambda/4$ from each other along the transmission line, where $n$ is any integer, said detector-means each producing a unidirectional voltage dependent upon the magnitude of a given quantity in the guide at its point of coupling, combining-circuit means associated with only said two detector-means for producing an electrical quantity which is the sum of only the two electrical quantities which appear in the output-terminals of the two detector-means, and response-means included in said circuit-means for responding to the sum of the unidirectional outputs of the two detector-means.

3. Means for determining the sum of the average power of the incident wave, plus the average power of the reflected wave, in a wave guide, consisting of two separate rectified-power means for obtaining two rectified power-responses at two different points, said two separate means being substantially identical and being substantially identically coupled, spaced an odd number of quarter-wavelengths apart from each other, along the wave guide, combining-circuit means associated with only said two rectified-power means for producing an electrical quantity which is the sum of only said two rectified power-responses, and means for obtaining a response to said sum.

4. Means for determining the sum of the average power of the incident wave, plus the average power of the reflected wave, in a transmission line, consisting of two separate rectified-power means for obtaining two rectified power-responses at two different points, said two separate means being substantially identical and being substantially identically coupled, spaced an odd number of quarter-wavelengths apart from each other, along the transmission line, combining-circuit means associated with only said two rectified-power means for producing an electrical quantity which is the sum of only said two rectified power-responses, and means for obtaining a response to said sum.

THEADORE MILLER.

REFERENCES CITED

The following references are of record in the file of this patent:

UNITED STATES PATENTS

| Number | Name | Date |
|---|---|---|
| 2,423,390 | Korman | July 1, 1947 |
| 2,442,606 | Korman | June 1, 1948 |